INVENTOR
GEORGE F. KNAPP

United States Patent Office 3,459,257
Patented Aug. 5, 1969

3,459,257
ROOM COOLING SYSTEM
George F. Knapp, 8444 Lucerne Drive,
Chagrin Falls, Ohio 44022
Filed July 24, 1967, Ser. No. 655,448
Int. Cl. F24f 3/14
U.S. Cl. 165—3                                    7 Claims

ABSTRACT OF THE DISCLOSURE

A comfort conditioning system utilizing the heat transfer characteristics of radiant type panels and controlled by a humidity sensor exposed to outside conditions to maintain the panel temperature at a level above the existing dew point. The cooling effect may be employed in conjunction with a forced air ventilation system which cooperates in the control of the humidity and temperature of the area under the direction of an indoor humidity sensor. The cooling system is adaptable for use with an existing radiant panel heating system and senses dew point levels to control cooling and also maintain indoor conditions at a level to prevent condensation upon the heat transfer panels.

---

This invention relates to air conditioning systems and more particularly to the radiant panel type heating and cooling systems wherein a heat transfer medium is circulated through conduits which may be located in the ceiling of the area under control to transfer heat to or from radiant panels of appreciable area to efficiently provide the heat transfer function.

Although the radiant conditioning system is usually thought of in relation to the radiant heating systems wherein hot water is circulated through the conduit system to emit radiant heat which is effective to elevate the temperature of bodies within the area under control, radiant conditioning performs as well in the reverse sense wherein cold or chilled water is circulated through the conduits to accept radiant heat from bodies and objects within the area of control. This invention is primarily concerned with the cooling effect of such a system and provides a unique means for effecting a more simplified and efficient manner of regulating the temperature and humidity conditions within an enclosed area.

To understand how such a radiant cooling system operates, it must be understood that the basic problem in such a cooling system is not to lower the ambient temperature of an area, as in the conventional convective systems but rather to provide conditions which will make it comfortable for persons within the area. The problem is that human generate heat and a portion of this heat is emanated from the body in a radiant form. The radiant cooling concept works on the principle of providing a receptor for such radiant heat of suitable capacity to provide a sensible cooling effect. Thus, it is not so important that ambient room temperatures be maintained at low levels but rather that sufficient radiant heat may be accepted from the body to provide a cooling effect.

Although radiant cooling systems are not new, many of the systems now in use are inefficient in operation and are subject to several drawbacks. Control of these systems is usually maintained by a room thermostat or humidistat which is actually monitoring the ambient conditions of the room, a great portion of which is subject to the convective heating and cooling effects of the various bodies within the area. Also many of these systems may have even less control and employ the cooling at a single desired temperature which is substantially cooler than any temperature encountered within the area and which has no relation to the various existing conditions either inside or outside. It is apparent then that such a system, set to a minimal cooling temperature, will be inefficient and often subject to deleterious effects when adverse conditions are encountered, such as for example, high humidity conditions, which may cause a condensation upon the conditioner panels.

Therefore, it is an object of this invention to provide an improved room conditioning system which employs a unique cntrol of the temperature of the cooling medium of the system to prevent the formation of condensation upon the panels of the system.

It is another object of this invention to provide an improved room conditioning system which utilizes a flow of outside air to aid in the control of the humidity and temperature conditions within the area.

It is still another object of this invention to provide an improved room conditioning system in which the comfort level is directly related to outside conditions to eliminate the shock of entering a conventional conditioned building which is maintained at much lower conditions than those existing outside.

It is a further object of this invention to provide an improved room conditioning system which is simplified over previous systems but which produces greater economy since a more sensible control of temperature and humidity conditions is maintained and since it is not necessary to maintain a tight building to prevent the entrance of outside air.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
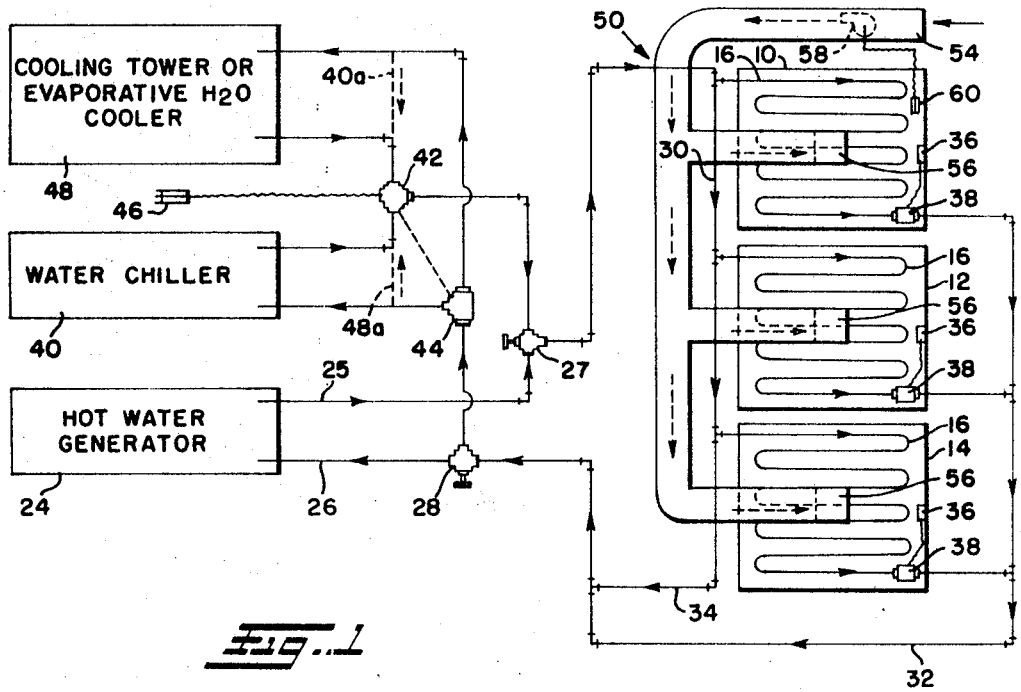
FIG. 1 is a schematic diagram showing a plural room conditioning system and the relationship of the sensing devices to the heating, cooling and ventilating means.

In FIG. 1 there is shown a complete system for controlling both the heating and cooling of three rooms 10, 12, 14 of a typical building by means of the radiant type heat transfer system. Although the heat transfer conduit and panel system is not shown in detail, an appreciation of its construction may be gained by reference to FIG. 2. These systems are well established in the art and consist of a conduit system 16 which is articulated throughout a particular surface of a room 17 which most often is the ceiling 18 but may as well be the floor 19 or wall 20. Heat from such a conduit system 16 is usually transferred to a panel system 22 which provides sufficient area to allow an effective heat transfer to and from objects within the room 17. The panels 22 are often in direct physical contact with the conduit system 16 although this is not necessarily always true since spaced panel designs are often utilized, the only prerequisite being that suitable heat transfer may occur between the panels 22 and the conduit system 16. In panels that are in direct contact with the conduit system, heat transfer occurs primarily on a conductive basis and the panel acts merely as a radiator extending the surface area of the conduit system. In spaced panel designs such heat transfer occurs primarily as radiant and convective heat flow, however, the teachings of this invention are applicable to all these types of systems since the invention is concerned primarily with the radiant heat transfer between the panel system 22 and objects within the room 17.

This embodiment of the invention is a complete and refined system and includes a hot water generator 24 for elevating the temperature of a fluid heat-carrying medium and for circulating the fluid through a supply 25 and return 26 lines and diverting valves 27, 28 to the conduit system 16 forming a part of the radiant panel heating system for each of the rooms 10–14. Thus, the hot water generator 24 supplies fluid at an elevated temperature through a supply line 25 to a two-position valve 27 which is switched between summer and winter conditions to obtain either a heating or cooling effect through the radiant panel system. In the heating mode the valve 27 will be in the position so that fluid from the hot water generator 24 may flow freely through the valve 27 to the supply line 30 for the rooms 10–14 of the building. A return line 32 for delivering fluid back to the hot water generator 24 is directed to a summer-winter diverting valve 28 which in the heating mode is opened to allow the flow of fluid to the hot water generator. The supply line 30 is connected to each of the individual rooms 10–14 and also to the return line 32 by a conduit connecting 34 to describe one embodiment of a heating system which may utilize the teachings of this invention. However, the invention is not to be construed as limited to such a heating system shown as it is applicable as well to series, parallel or combination type systems for multiple rooms or for multiple heat transfer units within a single room.

Individual room temperature control is provided by winter space thermostats 36 located in each of the rooms which control the opening of winter space modulating valves 38 connected between the radiant panel conduit system for each room and the return line 32. Thus, it is apparent that the quantity of heat supplied to each room 10–14 is a function of the opening of the modulating valves 38 which in turn are controlled by thermostats 36 located within the rooms.

Also shown in FIG. 1 are several means for cooling the fluid transfer medium under summer environmental conditions when the hot water generator 24 would not be utilized. A water chiller 40 which may be a conventional refrigeration type for reducing the temperature of the fluid medium is shown connected to the supply line 30 through a series of valves, the first being the cool water proportioning valve 42 and the second being the summer-winter valve 27 which selects between the heating and cooling systems as described previously. The return of the fluid medium to the water chiller 40 occurs from the return line 32 through the summer-winter diverting valve 28 and through a cool water diverting valve 44. The cool water proportioning valve 42 is an automatic type valve which is actuated under the control of a humidity sensing device 46 which is exposed to outdoor atmospheric conditions. The operation of the proportioning valve 42 is such as to vary the quantity of fluid flow from the water chiller 40 to the supply line 30 and the rooms 10–14 in proportion to the outdoor conditions as monitored by the humidity sensor 46.

The humidity sensor 46 is preferably a dew point measuring device and may take the form of a Foxboro Dewcell element. This provides the most accurate method of determining the moisture content of the air and the readings of the device may be converted to other utilizable humidity standards. The humidity sensor 46 provides a continuous modulating control of the proportioning valve 42 and as will be pointed out allows a constant flow of fluid to the supply line 30, but alters the temperature of the fluid by mixing fluid from different temperature sources.

The system further includes a second means 48 for cooling the fluid medium which may be an alternative manner of providing the cool temperatures required or may be used in conjunction with the water chiller 40. This cooling means 48 may comprise a cooling tower or an evaporating type water cooler, the operations of which are well understood by those skilled in the art. When used in conjunction with the water chiller 40, the fluid from this cooling means 48 is transported to the supply line 30 and to the conduits 16 of the individual rooms 10–14 by way of the cool water proportioning valve 42 and the summer-winter valve 27. A return flow of the fluid occurs from the return line 32 associated with the rooms 10–14 through the summer-winter diverting valve 28 as described previously for the water chiller 40 and through the cool water diverting valve 44. The cool water diverting valve 44, in this embodiment, operates in conjunction with the proportioning valve 42 so that as fluid is selected from the water chiller 40 or the cooling means 48, a return flow will be provided to the appropriate source.

Alternatively the water chiller 40 or cooling means 48 may be utilized independently in a simplified cooling system. In this mode one of the sources 40, 48 will be disconnected, the inputs to the proportioning valve 42 will be conected to the remaining source and to the respective return line to that source by either of the connections shown as dashed lines 40a or 48a respectively, so as to mix the heated return fluid with the cooler supply fluid to attain a desired temperature of fluid at the supply line 30, while maintaining a constant flow of fluid.

A ventilation system 50 is shown in association with each of the rooms 10–14 under control of the conditioning system, where a ventilation duct 52, exposed to the outside atmosphere at entrance duct 54 channels air to each of the rooms 10–14 by a centrally located louver 56, for example. A fan 58 may be located in the ventilation duct 52 near the entrance portion thereof to supply a forced flow of air to each of the rooms 10–14. It will be assumed that the rooms have some means provided for exhausting this air to the outside atmosphere and this may consist of a duct system or as simple an expedient as relying on an open window or the air leakage in a non-airtight building or enclosure. The ventilation system shown is but one example of an embodiment which might be suitable for use with this invention, however, it will be understood that the system could as well be a forced exhaust system or even in some instances, may rely on a natural flow of air through the room. A humidistat 60 is shown in one room 10 and as indicated by the dashed lines, controls the operation of the fan 58 located in the ventilation duct 52. Thus, the ventilation system 50 operates as a function of the humidity as sensed in one of the rooms 10–14. It is obvious that a plurality of humidistats may be employed as well for control of the fan 58 so that the operation of the cooling system is a function of the least desirable conditions encounterable in any of the rooms 10–14.

The principle of operation of this cooling system is concerned with the fact that when humans occupy a particular space, not only heat but moisture as well is dissipated by the occupant into the space. Thus, it can be assumed that for most outside environmental conditions of temperature and humidity, higher levels will be encountered within the space due to the presence of the occupants. It is apparent that some relief from inside conditions can be obtained merely by providing a flow of outside air through the room. Such an effect is perhaps not so obvious in the control of humidity but if it is assumed that indoor humidity is greater than that of the outside it is seen that it can be alleviated to some extent by the transferral of air between these two areas. Additionally, it is clear that by providing some form of cooling, such as the radiant conditioner panel system, the radiant heat emanated by occupants of a room may be readily accepted by such a system to provide a control of the comfort conditions of the room. As pointed out previously, the cooling means 40, 42 are under the control of a humidity sensor 46 exposed to the outside atmosphere and may be operated independently and the ventilation system 50 is under the control of a humidistat 60 exposed to indoor conditions.

The outdoor humidistat 46 is actually an outdoor dew point sensing device and such sensing is designed to reset the surface temperature of the radiant panel 22 so as to maintain the temperature above the outside level of conditions and in particular the outside dew point level. It is apparent that such expedient therefore, will prevent condensation from occurring on the radiant panels 22 of the cooling system located within the room, so long as a differential of approximately 1–2° F. is maintained over outdoor conditions.

Figure 2:
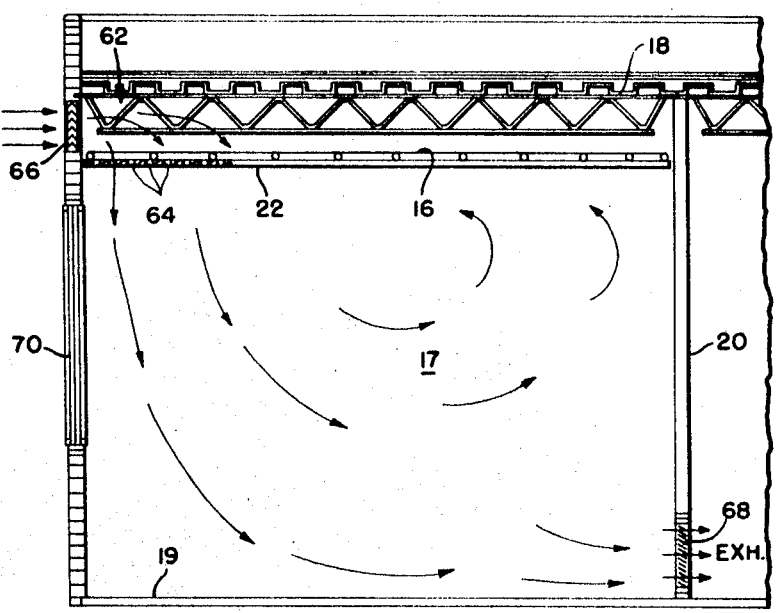
FIG. 2 is a schematic drawing of a room employing the conditioning system of the invention, showing one scheme for providing ventilation for the room.

FIG. 2 is a schematic representation of a typical room having a panel type conditioning system which embodies the teachings of this invention. The panels 22 of the system are disposed in the ceiling area 62 of the room and may have a plurality of perforations 64 therein. An outside air louver 66 is located in one wall of the room and an exhaust air grill 68 is located, for instance, in an opposite wall. Ventilation therefore, may be effected by a forced air flow either on the intake side or at the exhaust air grill 68. Further, such ventilation may be effected by a natural flow of air and may utilize different apertures such as, for example, an open window 70. In this particular construction, air may be directed through the perforations 64 of the panel 22 and as well as performing the ventilation effect may also effect some cooling by a conductive and convective heat transfer with the panels. If the cooling system employs forced air ventilation, control of the fan will be by means of a humidistat or other humidity sensing device, located within the room as previously described. The location of the fan may also affect the efficiency of the cooling system and it is reasonable to take advantage of dissipating the heat of the fan by locating it at the exhaust point. A nominal 2° F. sensible heat rise may be circumvented by this expedient under certain room environmental conditions.

Other modes of applying the principles of the invention may be employed, change being made as regards the details described, provided the features stated in any of the following claims or the equivalent of such be employed.

I, therefore, particularly point out and distinctly claim as my invention:

1. A room conditioning system of the radiant panel type comprising means for cooling the radiant panels of the conditioning system, means for varying the temperature of the cooling means, a dew point sensing element for sensing outdoor humidity conditions and for controlling the temperature varying means to maintain the surface temperature of the radiant panels above the outdoor dew point temperature, a fan for forcing outdoor air through the room, and humidity sensing means in the room for controlling the operation of the fan.

2. A room conditioning system for regulating indoor temperature and humidity conditions, comprising a radiant panel of extended surface area occupying a substantial portion of an area under control, a conduit system associated with the panel for channeling heat transferral fluid in close relation to the panel and for transferring heat to the panel, a chiller for lowering the temperature of the heat transferral fluid, a valve connected between the chiller and the conduit system, the valve being operative to regulate the temperature of the heat transferral fluid at the conduit system, and a dew point sensing device exposed to outdoor conditions for operating the valve to maintain the temperature of the heat transferral fluid and the panel sufficiently above the outdoor dew point level to prevent condensation upon the panel, a ventilation system in association with the area under control for providing communication with the outdoor air, a fan in the ventilation system for transferring outdoor air into the area under control, and a humidity sensing device exposed to the area under control for actuating the fan.

3. An air conditioning system for an enclosed area comprising heat transferral means in the enclosed area, means for cooling said heat transferral means, means for sensing humidity outside the enclosed area and for controlling said cooling means to maintain the surface temperature of said heat transferral means above the outside area dew point level, means for transferring air between the outside area and the enclosed area, and humidity sensing means in the enclosed area for controlling said air transferring means.

4. The method of cooling a room area within a building by a radiant panel cooling system comprising the steps of monitoring the dew point temperature of the air outside the building, regulating the surface temperature of the radiant panels within the room area to maintain same slightly above the dew point temperature, monitoring the humidity level of the room area, and ventilating the room area by the transferral of outside air, such ventilation occurring as a function of the monitored humidity level of the room area, thereby efficiently cooling the room area and preventing condensation upon the panels.

5. A room conditioning system as set forth in claim 1, utilizing a heat transferral fluid wherein the temperature varying means comprises a fluid valve connected between the cooling means and the radiant panels to proportion a mixture of fluid at different temperatures for supply to the radiant panels.

6. A room conditioning system as set forth in claim 5, wherein the cooling means is an evaporating water cooler, the fluid valve having inlets connected to the water cooler and the return line to the water cooler and an outlet connected to the radiant panel system, the valve being operative in response to the dew point sensing element to proportion fluid flow from the water cooler and the return line to maintain the surface temperature of the radiant panels above the outdoor dew point temperature.

7. A room conditioning system as set forth in claim 5, wherein the cooling means comprises a water chiller and an evaporative water cooler, the fluid valve being connected to the chiller and cooler and to the radiant panel system to proportion the flow of fluid between the chiller and the cooler in response to the dew point sensing element to maintain the surface temperature of the radiant panels above the outdoor dew point temperature.

References Cited
UNITED STATES PATENTS

| | | | |
|---|---|---|---|
| 3,120,866 | 2/1964 | Mills | 165—49 |
| 3,326,012 | 6/1967 | Asker et al. | 165—21 |

ROBERT A. O'LEARY, Primary Examiner

CHARLES SUKALO, Assistant Examiner

U.S. Cl. X.R.

165—21